:::

United States Patent [19]

Albom

[11] 4,332,912
[45] Jun. 1, 1982

[54] SULFUR-AGGREGATE COMPOSITIONS AND METHODS FOR PREPARING

[75] Inventor: Bradley S. Albom, Richmond, Calif.

[73] Assignee: Chevron Research, San Francisco, Calif.

[21] Appl. No.: 237,350

[22] Filed: Feb. 23, 1981

[51] Int. Cl.³ .............................................. C04B 33/04
[52] U.S. Cl. ................................ 501/140; 106/287.32
[58] Field of Search .............. 106/70, 287.32, DIG. 4; 501/140

[56] References Cited

U.S. PATENT DOCUMENTS

| | | | |
|---|---|---|---|
| 3,954,480 | 5/1976 | Inderwick | 106/70 |
| 4,025,352 | 5/1979 | Leutner et al. | 106/70 |
| 4,188,230 | 2/1980 | Gillott et al. | 106/70 |

OTHER PUBLICATIONS

Shrive et al., A Study of Durability in Temperature Cycles and Water Resistance of Sulfur Concretes and Mortars, J. Testing and Evaluation, vol. 5, No. 6, 1977, pp. 484–493.

Davis, The Swelling of Bentonite and its Control Industrial and Engineering Chemistry, vol. 19, No. 12, pp. 1350–1352.

*Primary Examiner*—James Poer
*Attorney, Agent, or Firm*—J. A. Buchanan, Jr.; T. G. DeJonghe; L. S. Squires

[57] ABSTRACT

Sulfur cement-aggregate compositions such as sulfur cement concrete and mortars, comprising a sulfur cement and an aggregate and processes for preparing such products. The composition is characterized by the use of an expansive clay contaminated aggregate, which has been pretreated with a salt solution (e.g., KCl, CaCl$_2$, etc.). The salt solution pretreatment substantially improves the water stability of the final sulfur cement and aggregate product.

26 Claims, No Drawings

SULFUR-AGGREGATE COMPOSITIONS AND METHODS FOR PREPARING

BACKGROUND OF THE INVENTION

1. The Invention

This invention relates to sulfur cement and aggregate compositions. In a further aspect, the invention relates to sulfur mortars and concretes containing an aggregate which is contaminated with a water-expansive clay.

2. The Prior Art

Sulfur mortars and concretes generally refer to a mixture of sulfur and aggregate wherein the sulfur functions as the cement or binder. Generally, whether a composition is classed as a mortar or concrete is based on the particle size of the predominate aggregate. Thus, compositions containing larger sized aggregates are generally referred as concretes whereas compositions containing smaller sized aggregate are referred to as mortars. In either case, the compositions can also contain very fine particle size aggregates, such as fly ash, etc., as fillers. Sulfur mortars and concretes are prepared by heating sulfur with an aggregate at a sufficient temperature to render the sulfur molten and then allowing the mixture to cool to solidify the sulfur. Not infrequently, the sulfur also contains a plasticizer which desirably increases the cold plasticity crystallization time of the sulfur, probably by reacting with at least a portion of the sulfur. Such sulfur is referred to as plasticized sulfur.

Sulfur mortars and concretes can be broadly classified as sulfur cement products. Sulfur cement is similar to Portland cement in forming concretes or mortars. In the latter case, the mixture of Portland cement and aggregate is solidified into a final solid product by treatment with water. In the sulfur cement case, heat is used.

Sulfur cement concretes can be used for many of the same purposes as conventionally formed Portland cement concretes. For example, sulfur concretes can be used for structural members, roads, slabs, curbings, gutters, and can be precast or cast at the job site. Sulfur concrete affords a significant advantage over Portland cement concrete, especially in the case of preformed articles, in that the sulfur cement concrete can be remelted and recast. Thus, when defective or surplus articles are prepared, the sulfur-aggregate composition can be reused by merely melting down the article and recasting the composition. Sulfur cement mortars can be used for similar purposes as Portland cement mortars, such as, for example, bonding structural members together. Sulfur cement mortars and concretes also generally have good corrosion resistance to acids and other chemicals.

Sulfur cement, mortars and concretes are well-known to the art and various modifications are, for example, described in the patent literature, for example, U.S. Pat. Nos. 2,135,747, 3,954,480, 4,025,352, 4,058,500, and 4,118,230.

One of the disadvantages of sulfur cement mortars and concretes is that the presence of even small amounts of water-expansive clay (for example, 1 percent by weight or more) in the aggregate causes the solidified sulfur cement mortars and concretes to disintegrate when exposed to water. This problem is particularly serious since, because of transportation costs, economic necessity usually requires the use of aggregate sources close to the casting or job site, regardless of the presence of expansive clay. The expansive clay can be removed from the aggregate by washing procedures but such procedures are also generally inconvenient and uneconomical. Thus, if the local sources of aggregate contain expansive clay, the use of sulfur cement mortars concretes is pragmatically severely restricted.

U.S. Pat. No. 4,188,230 teaches that this problem may be obviated by the incorporation of petroleum or polyol additives. Such procedures have not, in fact, proved entirely satisfactory. The problem of water-expansive clays was also considered in an article by Shrive, Gillott, Jordaan and Loov, appearing at Page 484 of the *Journal of Testing and Evaluation* (1977). In this article, the results of certain experiments with water-expansive clays are described. In these experiments, a mixture containing 3 parts, by volume, fly ash, and 2 parts bentonite clay was slurried with water. Batches of this slurry were, respectively, mixed with aqueous solutions containing 1 percent and 5 percent by weight calcium hyroxide or potassium chloride and allowed to stand overnight. Sulfur cement samples were prepared by slowly adding the slurries (to evaporate water) to molten sulfur. The final compositions contained 75:15:10 parts by volume of sulfur:fly ash:bentonite clay. Samples of the treated and untreated compositions were immersed in water after setting for 1 day and 7 days. Both the treated and untreated samples disintegrated within 3 or 4 hours of immersion and accordingly the authors discontinued the investigation.

SUMMARY OF THE INVENTION

It has now been discovered that by first treating the aggregate with a salt solution, that aggregate, containing up to about 5 percent by weight expansive clay, can be successfully used to afford sulfur cement-aggregate compositions have excellent resistance to water. This treatment is relatively simple and convenient and has broad applicability, because most aggregate contains less than 5 percent by weight expansive clay and most generally contain less than about 3 percent by weight expansive clay. Thus, the present invention is very significant to the commercialization of sulfur cement mortars and concretes.

In one embodiment, the invention comprises a sulfur cement and aggregate composition, comprising a sulfur cement and an aggregate, containing up to about 5 percent by weight and preferably less than 4 percent by weight, based on the aggregate, of an expansive clay, which has been pretreated with a salt solution to substantially improve the resistance of said composition to water deterioration.

In a further embodiment, the invention provides a process for preparing a sulfur cement concrete using an aggregate containing up to 5 percent by weight, based on the aggregate, of expansive clay comprising the improvement of contacting said aggregate with an amount of a solution of a salt, effective to substantially reduce the water expandability of said expansive clay, and substantially drying said aggregate prior to admixture with the sulfur binder.

The invention will be further described hereinbelow.

FURTHER DESCRIPTION OF THE INVENTION AND PREFERRED EMBODIMENTS

The theory or mechanism of the present invention is not clearly understood. Initially, it was conjectured that the improved stability afforded by the present invention was caused by the ion exchange replacement of the sodium ions in the expansive clay with other ions. It was then discovered that improved stability was also obtained using sodium salt (e.g., sodium chloride) solution and E. L. Nimer discovered, and described in commonly assigned U.S. patent application Ser. No. 237,349 filed on even date herewith, that improved stability was also obtained by merely mixing solid salts with the expansive clay-containing aggregate. Thus, the ion exchange theory is not consistent and no other theory is readily apparent. Nonetheless, the present invention affords a very substantial improvement in water stability which permits the use of locally available aggregates, containing up to about 5 percent expansive clay, in sulfur cement-aggregate compositions.

In accordance with the present invention, aggregate containing up to about 5 percent by weight expansive clay is contacted with a salt solution prior to being mixed with the sulfur cement. Such contact can be conveniently accomplished by washing or slurrying the aggregate with the salt solution or by simply spraying the salt solution on the aggregate. It is important to note, however, that the treatment must be effected prior to combining the aggregate with the sulfur binder, because I have found that contacting the finish sulfur cement-aggregate product with the salt solution is ineffective to afford any significant improvement in water stability. Also, it is very much preferred to dry the treated aggregate prior to admixture with the sulfur cement. This generally poses no inconvenience, since typically the aggregate is, in any event, preheated prior to admixture with the sulfur cement to remove entrained moisture, eliminate cold spots and generally improve sulfur cement bonding to the aggregate. Thus, the conventional preheating step used to prepare sulfur cement-aggregate mixtures can also be used to dry the aggregate.

Suitable salts which can be used include both inorganic salts and organic salts. Mixtures of different salts can also be used. The salt must, of course, be soluble in the solvent used. In general, from pure cost economics, the solvent will be water and thus generally water soluble salts will be used. The term "water soluble salts" refers to salts having solubilities in water of at least 5 g per liter of water at 30° C. Preferably, the water soluble salts used in the present invention have water solubilities of at least 10 g per liter of water, at 30° C.

In terms of the cation, suitable salts which can be used include, for example, salts having the cations of Groups I, II and III of the Periodic Table as well as ammonium, iron, and the like. Preferred cations include potassium, the alkaline earth metals, iron, aluminum, and copper. In terms of the anion, suitable salts include, for example, salts having anions such as halides, nitrates, nitrites, sulfates, carbonates, acetates, oxalates, and the like. Specific examples of suitable salts include potassium chloride, potassium nitrite, calcium chloride, calcium nitrite, ferric chloride, aluminum sulfate, sodium carbonate, potassium bicarbonate, ammonium chloride, tetraethylammonium chloride, calcium bromide, cupric chloride, sodium nitrate, sodium nitrite, potassium sulfate, and the like, and mixtures thereof. Because of their wide availability, high water solubility and low cost, chloride salts are preferred. Potassium and calcium salts are especially preferred because they are relatively inexpensive and afford excellent results. Best results are generally obtained using a potassium salt, and especially using potassium chloride. Also, although sodium chloride is not one of the preferred salts in terms of performance, it affords the advantage of low cost, particularly if a local commercial or natural source (e.g., sea water, salt lakes) of salt water is available. Depending on the concentration of such commercial or natural salt water, it can be used directly or can be first fortified with additional quantities of sodium chloride or other water soluble salts.

Typically, the salt solution will have a salt concentration in the range of about from 2 to 20 percent by weight, preferably about from 4 to 18 percent by weight and most preferably about from 8 to 12 percent by weight, though higher salt concentrations could also be used depending upon the solubility of the salt in the particular solvent (e.g., water). Typically, best results are obtained using molar concentrations in the range of about from 0.5 to 2 mols of salt(s) per liter of solution. Generally, about from $1.25 \times 10^{-4}$ to 1.25 g-mols of the salt (or mixtures of salts) is used per gram of expansive clay contained in the aggregate. In terms of a more convenient commercial weight basis, typically, about from 0.003 to 0.05, preferably about from 0.005 to 0.02 parts by weight of salt(s) is used per part by weight of expansive clay contained in the aggregate.

Save for the incorporation of the aggregate salt treatment, of the present invention, the present sulfur-aggregate compositions can be prepared in the same manner as conventional sulfur-aggregate compositions or by any other suitable procedure. Both sulfur cement mortars and concretes can be prepared by the same general procedure with the exception that in the case of concretes, larger sized aggregate is used.

As before noted in the present case, the invention permits the use of aggregate, including mixtures of aggregates, containing a deleterious amount of expansive clay up to 5 percent by weight, based on the weight of total aggregate. Generally, maximum improvement is obtained with respect to aggregates containing about from 1 to 3 percent expansive clay by weight.

In a preferred embodiment of the invention, a water solution of the salt, preferably potassium chloride or calcium chloride, is simply sprayed onto the aggregate. The aggregate is then heated and dried and admixed with the molten sulfur cement. The molten mixture is then formed into shape and allowed to solidify by cooling. The final product is sulfur concrete or mortar having excellent resistance to breakup upon exposure to water. This mode is conveniently attractive because of its convenience.

In another embodiment, the expansive clay-contaminated aggregate can be immersed or slurried in the salt solution. Preferably, sufficient solution is used to thoroughly wet the aggregate. Contact time is generally not critical and typically, the wetted aggregate can be simply allowed to air dry and/or can be dried by preheating the aggregate. As before noted, preheating generally does not require an additional step since it is generally conventional to preheat the aggregate prior to mixture with the molten sulfur cement to avoid cold spots.

The sulfur cement can be substantially sulfur and/or unaltered plasticized sulfur and, if desired, can contain minor amounts of various fillers and other compatible additives (e.g., flame retardants, ductilating agents, etc.). Best results are obtained using plasticized sulfur or mixtures of sulfur and plasticized sulfur.

The term "plasticized sulfur" refers to the reaction product of sulfur with a plasticizer and/or mixtures of sulfur and plasticizers and/or the reaction product of sulfur with a plasticizer. Sulfur content (or total sulfur) as used herein includes both unreacted sulfur and the sulfur content of such reaction products. Although it is not wholly necessary to use plasticized sulfur as the sulfur cement in the present invention, I have found that the compositions of invention containing plasticized sulfur generally have much superior water stability to the corresponding composition using sulfur as the cement without a sulfur plasticizer. Where a plasticizer is used, the amount of the plasticizer(s) will vary with the particular plasticizer and the properties desired in the cement. The cement can contain about from 0.1 to 10 percent of the plasticizer and typically will contain about from 2 to 7, preferably about 2½ to 5 percent by weight, based on the total weight of sulfur in the composition.

The term "sulfur plasticizer" or "plasticizer" refers to materials or mixtures of materials which, when added to sulfur, lower its melting point and increase its crystallization time. One convenient way to measure the rate of crystallization is as follows: the test material (0.040 g) is melted on a microscope slide at 130° C. and is then covered with a square microscope slide cover slip. The slide is transferred to a hot plate and is kept at a temperature of 70° ± 2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

Inorganic plasticizers include, for example, the sulfides of iron, arsenic and phosphorus, etc. Generally, the preferred plasticizers are organic compounds which react with sulfur to give sulfur-containing materials.

Suitable sulfur plasticizers which can be used include, for example, aliphatic polysulfides, aromatic polysulfides, styrene, dicyclopentadiene, dioctylphthalate, acrylic acid, epoxidized soybean oil, triglycerides, and tall oil fatty acids, and the like, and compatible mixtures thereof.

One class of preferred plasticizers are aliphatic polysulfides, especially those that will not form cross-linking. Thus, butadiene is not a preferred constituent to form the aliphatic polysulfide, as it may form cross-linking sulfur bonds, whereas dicyclopentadiene is a preferred compound for forming the aliphatic polysulfide useful as the sulfur plasticizer. With molten sulfur, dicyclopentadiene forms an extremely satisfactory aliphatic polysulfide.

Another class of preferred plasticizers for use in the composition of the present invention are aromatic polysulfides formed by reacting one mol of an aromatic carbocyclic or heterocyclic compound, substituted by at least one functional group of the class —OH or —NHR in which R is H or lower alkyl with at least two mols of sulfur.

Suitable organic compounds of this type include: phenol, aniline, N-methyl aniline, 3-hydroxy thiophene, 4-hydroxy pyridine, p-aminophenol, hydroquinone, resorcinol, meta-cresol, thymol, 4,4'-dihydroxy biphenyl, 2,2-di(p-hydroxyphenol) propane, di(p-hydroxyphenyl) methane, etc., p-phenylene diamine, methylene dianiline. Phenol is an especially preferred aromatic compound to form the aromatic polysulfide.

The aromatic polysulfides are generally prepared by heating sulfur and the aromatic compound at a temperature in the range of 120° to 170° C. for 1 to 12 hours, usually in the presence of a base catalyst such as sodium hydroxide. (See for example, Angew, Chem. Vol. 70, No. 12, Pages 351-67 (1958), the polysulfide product made in this way has a mol ratio of aromatic compound: sulfur of the 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

Another type of aliphatic polysulfide useful as a plasticizer for this invention are the linear aliphatic polysulfides. Although these polysulfides may be used alone as the sulfur plasticizer, it is preferred to use them in combination with either (a) dicyclopentadiene or (b) the aromatic polysulfides described above, especially with the phenol-sulfur adduct. In this connection, the preferred plasticizer mixtures contain from 5 to 60 percent by weight linear aliphatic polysulfide, based on total plasticizer, preferably about 20 to 50 percent by weight.

These aliphatic polysulfides may have branching indicated as follows:

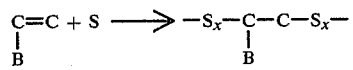

wherein x is an integer of from 2 to 6 and wherein B is H, alkyl, aryl, halogen, nitrile, ester or amide group. Thus, in this connection the aliphatic polysulfide is preferably a linear polysulfide. The chain with the sulfur preferably is linear, but it can have side groups as indicated by B above. Also, this side group B may be aromatic. Thus, styrene can be used to form a phenyl-substituted linear aliphatic polysulfide. The preferred aliphatic polysulfides of this type are both linear and nonbranched.

Unbranched linear aliphatic polysulfides include those such as Thiokol LP-3 which contains an ether linkage and has the recurring unit:

wherein x has an average value of about 12. The ether constituent of this aliphatic polysulfide is relatively inert to reaction. Other suitable aliphatic polysulfides have the following recurring units:
- $-S_x-(CH_2)-_yS_x-$ from reaction of alpha, omega-dihaloalkanes and sodium polysulfide;
- $-S_x-(CH_2CH_2-S-CH_2CH_2-)S_x-$ from reaction of alpha, omega-dihalosulfides and sodium polysulfide; and
- $-S_x-(CH_2CH_2-O-CH_2CH_2-)S_x-$ from reaction of alpha, omega-dihaloesters and sodium polysulfide wherein x is an integer of 2 to 5; and y is an integer of 2 to 10.

In some instances, it is preferred to use mixtures of materials having different reactivities with sulfur as the plasticizer. For example, very good results can be obtained using a mixture of cyclopentadiene and/or dicyclopentadiene with oligomers of cyclopentadiene. Various plasticizers are also described in the art, for example, see U.S. Pat. Nos. 4,058,500 and 4,190,460.

The sulfur cement can also contain very fine particle sized fillers such as, for example, fly ash, talc, mica, silicas, graphite, carbon black, pumice, insoluble salts (e.g., barium carbonate, barium sulfate, calcium carbonate, calcium sulfate, magnesium carbonate, etc.), magnesium oxide, and mixtures thereof. Such fillers typically have a particle size less than 100 mesh (U.S.A. Standard Testing Sieves) and preferably, less than 200 mesh. Such fillers generally act as thickening agents and generally improve the hardness or strength of the sulfur cement product. Where fillers are used, the sulfur cement typically contains about from 1 to 15 percent, and more generally, about from 5 to 10 percent of the filler, based on the weight of total sulfur.

Various other additives can be added as desired to alter various properties of the sulfur cement, as is well-known to the art; see, for example, U.S. Pat. Nos. 4,188,230 (durability altered by the addition of certain petroleum products); and 4,210,458 (viscosity altered by the addition of polyhydric alcohols).

With the exception that the aggregate must be treated with the salt solution prior to being mixed with the molten sulfur cement, the order of addition of the various ingredients is not critical. Also, it is generally preferred, where plasticizers are used, to add the plasticizer to the sulfur before adding the aggregate. The ingredients are finally mixed together at temperatures above the melting point of sulfur or plasticized sulfur and below the decomposition or boiling point of the materials. Typically, mixing is affected at temperatures in the range of about from 110° to 180° C. and preferably, about from 125° to 160° C. In a preferred mode, the sulfur is combined in molten form with the plasticizer and then mixed with preheated aggregate. It is preferred to preheat the aggregate to prevent random cold spots in the mix and ensure good bonding between the sulfur cement and aggregate.

Typically, in the case of the sulfur cement mortars, the mortar contains about from 10 to 50 percent by weight, preferably about from 15 to 25 percent by weight, of sulfur cement and about from 50 to 90 percent by weight, preferably about from 75 to 85 percent by weight, of fine-size aggregate. The fine-size aggregate generally has a particle size less than No. 8 mesh (U.S.A. Standard Testing Sieves), and preferably less than No. 16 mesh, and preferably, generally greater than 40 mesh and includes, for example, plaster sand, Kaiser top sand, Monterey sands, Vulcan sands, and the like, and mixtures thereof.

In the case of sulfur cement concretes, larger-sized aggregate is used in place of all or a portion of the smaller-sized aggregate used for mortars. Typically, the larger-sized aggregate has a particle size of about from No. 4 to 1½ inches, preferably, about from ⅜ to ¾ inches. The sulfur concrete also preferably contains a lesser amount of smaller-sized aggregate particulate material similar to that used in mortars. Such small-sized aggregate or particulate material includes, for example, the various aggregate previously described herein with respect to the present sulfur cement mortar and typically have a particle size in the range of less than No. 8 mesh and preferably less than 16 mesh (U.S.A. Standard Testing Sieves) but preferably predominantly greater than 40 mesh. Typically, the sulfur cement concrete comprises, by weight, about from 10 to 50 percent total sulfur cement (preferably containing 2½ to 7 percent plasticizer); 20 to 60 percent large-sized aggregate; and 30 to 70 percent small-sized aggregate.

As used herein, the term "mesh" is measured in and refers to the "U.S.A. Standard Testing Sieves" system also known as the "U.S. Sieve Series."

A further understanding of the invention can be had from the following non-limiting examples.

EXAMPLE 1

This example illustrates the improved stability of the sulfur aggregate compositions of the present invention as compared with the identical sulfur aggregate compositions prepared without the salt treatment of the present invention.

Control mortars containing 25 percent by weight plasticized sulfur (95 percent by weight sulfur, 2.5 percent by weight dicyclopentadiene and 2.5 percent by weight cyclopentadiene oligomer), 0, 0.5, 1.0, or 3.0 percent bentonite clay and the remainder Kaiser top sand having a mesh size in the range of No. 4 to 100, were prepared. The control mortars were prepared by oven drying the bentonite clay and then mixing the requisite amount of clay with the sand. The clay-sand (1,500 g) mixture was preheated to about 130° C. and then mixed with molten plasticized sulfur (500 g) at about 130° C. and cast into three 2"×4" cylinders (per composition) and aged at room temperature overnight. A representative cylinder was selected for each composition and immersed in tap water and periodically visually inspected for fractures, cracks, etc., as failure. The days to failure of the respective samples are given in Table 1, hereinbelow.

The above procedure was repeated for 1 percent or 3 percent bentonite clay composition but in this case, the clay was immersed in 1 molar aqueous salt solution and aged overnight in the solution at room temperature. The clay was then removed by filtration, dried and ground back to size. The clay was then mixed with sand as above, mixed with molten sulfur and cast into three 2"×4" cylinders and aged overnight at room temperature. A control sample was also run using water in place of the aqueous salt solution. A representative cylinder for each composition was immersed in tap water and examined for fractures, cracks, etc., as above. The particular salt used and the time to failure of the cylinder for each composition are set forth in Table 1 below.

TABLE 1

| SALT | % WT. CLAY | % WT. CLAY BASED ON AGGREGATE* | DAYS TO FAILURE |
|---|---|---|---|
| CONTROL | 0 | — | 17*¹ |
| CONTROL | 0.5 | 0.67 | 11 |
| CONTROL | 1.0 | 1.33 | 5 |
| CONTROL | 3.0 | 4.0 | 0.25 |
| WATER | 1.0 | 1.33 | 5 |
| WATER | 3.0 | 4.0 | 0.125*¹ |
| KCl | 1.0 | 1.33 | 30 |
| KCl | 3.0 | 4.0 | 6 |
| CaCl$_2$ | 1.0 | 1.33 | 26 |
| CaCl$_2$ | 3.0 | 4.0 | 3 |
| MgCl$_2$ | 1.0 | 1.33 | 26 |
| MgCl$_2$ | 3.0 | 4.0 | 3 |
| NH$_4$Cl | 1.0 | 1.33 | 16 |
| NH$_4$Cl | 3.0 | 4.0 | 3 |
| Al$_2$(SO$_4$)$_3$ | 3.0 | 4.0 | 7 |
| FeCl$_3$ | 3.0 | 4.0 | 7 |

*Aggregate = sand + clay
*¹All three cylinders tested and average value given

As can be seen from the above Table 1, where the control sample contained 1 percent bentonite, its life was 5 days whereas the life of the compositions, treated in accordance with the present invention, ranged from 16 days for ammonium chloride to 30 days for potassium chloride. In the case where the sample contained 3 percent bentonite, the average life increased from six *hours* for the control to from 3 days for ammonium chloride and magnesium chloride to 7 days for aluminum sulfate and ferric chloride and 6 days for potassium chloride. In each case where water was used alone, the average life was actually reduced as compared with the control.

EXAMPLE 2

In this example, the same procedure was followed as in Example 1, except that a sulfur plasticizer was not used and the clay (bentonite) was mixed with the aggregate (Kaiser top sand) and then lightly sprayed with a 1 molar aqueous salt solution using about 120 to 150 ml of solution per 1,500 g of clay aggregate. After spraying the clay-aggregate mixture, the mixture was dried and mixed with the molten sulfur at 125° to 135° C. and cast into three cylinders (per composition) as in Example 1. In certain instances, two trials were run for a given composition (i.e., six cylinders). A representative cylinder for each composition (or one for each trial where duplicate trials were run) was then immersed in tap water and visually inspected for cracks, crumbling, etc., every two hours for the first eight hours and then inspected daily thereafter.

The particular salt used and the life of the cylinders using that salt are set forth in Table 2 hereinbelow. (Where two trials were run, average values are given.)

As can be seen from Table 2, substantially poorer results were obtained than were obtained in Example 1, where the clay was immersed in the salt solution, but still substantially superior to a control sample wherein the clay-aggregate was sprayed with pure water. The poorer results can be attributed to the poorer salt solution contact with the clay-aggregate mixture and significantly the absence of sulfur plasticizer. (The significance of the plasticizer can be seen by comparing the water controls in Examples 1 and 2. In Example 1, using the plasticizer, the water control had a life of 3 hours whereas in the present example, the water control only had a life of 15 minutes.)

TABLE 2

| SALT | % WT. CLAY | % CLAY IN AGGREGATE | DAYS TO FAILURE |
| --- | --- | --- | --- |
| KCl | 3 | 4 | 7 days |
| CaCl$_2$ | 3 | 4 | 2 days |
| FeCl$_3$ | 3 | 4 | 3 hours |
| Al$_2$(SO$_4$)$_3$ | 3 | 4 | 3 hours |
| Water | 3 | 4 | 15 minutes |

EXAMPLE 3

In this example, the same procedure was followed as in Example 2, but in this instance, instead of being merely lightly sprayed with the salt solution, the clay-aggregate mixture was thoroughly wetted with a 1 molar salt solution. Also, instead of pure sulfur, the same sulfur binder (95 percent sulfur, 2.5 percent dicyclopentadiene and 2.5 percent cyclopentadiene oligomer) was used as used in Example 1. The molten compositions were cast into three cylinders and aged overnight as in Example 1 and then a representative cylinder for each composition was immersed in water and examined visually for fractures, cracks, crumbling, etc. (In some instances, trials were repeated for certain compositions and average values reported.) The observed life for each composition and the salt used are set forth in Table 3 hereinbelow.

As can be seen from Table 3, the compositions of the present invention exhibited very good stabilities, especially where 1 percent potassium chloride or calcium chloride was used.

TABLE 3

| SALT | % WT. CLAY | DAYS TO FAILURE |
| --- | --- | --- |
| KCl | 1 | 98+ |
| KCl | 5 | 41 |
| CaCl$_2$ | 1 | 98+ |
| CaCl$_2$ | 3 | 12 |
| CaCl$_2$ | 5 | 9 |

EXAMPLE 4

In this example, the same procedure as used in Example 3 was followed with the exception that a 100 percent sulfur cement was used in place of the sulfur and plasticizer cement of Example 3. Also, for experimental purposes, a number of higher clay content samples were used. The results of the tests are summarized in Table 4 hereinbelow. The poorer results shown at the 3 percent clay level in Table 4, as compared with Table 3, demonstrates the importance of the plasticizer and also that pragmatically, that the treatment was ineffective in aggregate having an expansive-clay concentration above 7.5 percent by weight.

TABLE 4

| SALT | % WT. CLAY | % CLAY IN AGGREGATE | DAYS TO FAILURE |
| --- | --- | --- | --- |
| CaCl$_2$ | 3 | 4 | 2 days |
| CaCl$_2$ | 5 | 6.7 | 1½ hours |
| CaCl$_2$ | 7.5 | 10 | ½ hour |
| CaCl$_2$ | 10 | 13.3 | 15 minutes |

EXAMPLE 5

In this example, the effect of altering the concentration of the salt solution used in the spray treatment of Example 3 was examined. The same procedure and sulfur cement as used in Example 3 was followed with the exception that the concentration of the clay in the aggregate was fixed at 3 percent and the concentration of calcium chloride in the aqueous solution was varied instead.

The results of these tests are summarized in Table 5 hereinbelow. As can be seen from Table 5, the stability of the final product improved as the ratio of salt to clay was increased from 0.0125 mols per 100 g of clay to 0.25 g-mols per 100 g of clay.

TABLE 5

| SALT | SALT CONCENTRATION G-MOLS/LITER | % CLAY | % CLAY IN AGGREGATE | G-MOLS OF SALT PER 100 G CLAY | DAYS TO FAILURE |
| --- | --- | --- | --- | --- | --- |
| CaCl$_2$ | 0.05 | 3 | 4 | 0.0125 | 2 |
| CaCl$_2$ | 0.5 | 3 | 4 | 0.125 | 7 |
| CaCl$_2$ | 1.0 | 3 | 4 | 0.25 | 12 |

Obviously, many modifications and variations of the invention described hereinabove and below can be made without departing from the essence and scope thereof.

What is claimed is:

1. A sulfur cement-aggregate composition, comprising a sulfur cement and an aggregate, contaminated with up to 5 percent by weight of an expansive clay, which has been pretreated prior to being mixed with said sulfur cement with an amount of a salt solution effective to substantially reduce the water expandability of said clay and wherein said solution has a salt concentration of at least about 2 percent by weight.

2. The composition of claim 1 wherein said sulfur cement comprises plasticized sulfur.

3. The composition of claim 1 wherein said salt is selected from the group consisting of potassium salts, alkaline earth metal salts, aluminum salts, and mixtures thereof.

4. The composition of claim 1 wherein said salt is a potassium salt.

5. The composition of claim 1 wherein said salt is potassium chloride.

6. The composition of claim 3 wherein said composition comprises about from 15 to 25 percent by weight of said sulfur cement and about from 75 to 85 percent by weight of said aggregate.

7. The composition of claim 1 wherein said aggregate is contacted with said salt solution by spraying said aggregate with said salt solution.

8. The composition of claim 1 wherein said salt solution is an aqueous salt solution.

9. The composition of claim 1 wherein said composition comprises a particulate filler.

10. The composition of claim 1 wherein said sulfur plasticizer sulfur comprises the reaction products of sulfur with dicyclopentadiene and oligomers of cyclopentadiene.

11. The composition of claim 1 wherein said sulfur cement-aggregate composition is a sulfur cement mortar whether said aggregate comprises a major portion of aggregate have a particle size of between No. 8 to No. 16 mesh.

12. The composition of claim 1 wherein said sulfur cement-aggregate composition is a sulfur cement concrete whether said aggregate comprises a major portion of aggregate have a particle size of between No. 8 mesh to ¾ inch diameter.

13. In a process for preparing sulfur cement-aggregate compositions which comprises admixing a molten sulfur cement with an aggregate contaminated with up to 5 percent by weight of an expansive clay, the improvement which comprises the steps of
   (a) pretreating said contaminated aggregate with an amount of a salt solution, effective to substantially reduce the water expandability of said contaminated aggregate and wherein said salt solution has a salt concentration of at least about 2 percent by weight; and
   (b) drying said pretreated aggregate prior to admixing it with said sulfur cement.

14. The process of claim 13, wherein said salt solution is an aqueous salt solution.

15. The process of claim 14, wherein said aqueous salt solution has a salt concentration in the range of about from 4 to 18 percent by weight.

16. The process of claim 13 wherein sufficient of said salt solution is contacted with said contaminated aggregate to provide about from 0.003 to 0.05 parts by weight of said salt per part by weight of said expansive clay.

17. The process of claim 13 wherein said pretreatment is effected by slurrying said aggregate with said salt solution.

18. The process of claim 13 wherein said pretreatment is effected by spraying said aggregate with said salt solution.

19. The process of claim 18 wherein said salt solution is an aqueous salt solution.

20. The process of claim 19 wherein said aqueous salt solution has a salt concentration of about from 0.5 to 2 mols per liter.

21. The process of claim 13 wherein said salt is selected from the group of potassium salts, alkaline earth metal salts, aluminum salts, and mixtures thereof.

22. The process of claim 13 wherein said salt is selected from the group of chloride salts, sulfate salts, and mixtures thereof.

23. The process of claim 22 wherein said salt is selected from the group of potassium salts, alkaline earth metal salts, and mixtures thereof.

24. The process of claim 23 wherein said salt is selected from the group of potassium chloride, calcium chloride, aluminum chloride, and mixtures thereof.

25. The composition of claim 1 wherein said aggregate is contaminated with less than about 4 percent by weight of said expansive clay.

26. The process of claim 13 wherein said aggregate is contaminated with less than about 4 percent by weight of said expansive clay.

* * * * *